(12) United States Patent
Brown et al.

(10) Patent No.: US 10,476,267 B2
(45) Date of Patent: Nov. 12, 2019

(54) SMART LOAD BANK AND EXCITATION CONTROL

(71) Applicant: Caterpillar Inc., Peoria, IL (US)

(72) Inventors: Douglas Brown, Dunlap, IL (US); Vijay Janardhan, Dunlap, IL (US); Eric Ohlson, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 259 days.

(21) Appl. No.: 14/937,545

(22) Filed: Nov. 10, 2015

(65) Prior Publication Data

US 2017/0133847 A1    May 11, 2017

(51) Int. Cl.
*H02J 3/14* (2006.01)

(52) U.S. Cl.
CPC ............. *H02J 3/14* (2013.01); *Y02B 70/3225* (2013.01); *Y02P 80/14* (2015.11); *Y04S 20/222* (2013.01)

(58) Field of Classification Search
CPC ........ H02J 3/14; H02J 13/002; H02J 13/0075; Y02B 70/3225; Y02B 90/222; Y02B 90/2638; Y02B 70/3226; Y10T 307/615
USPC .......................................................... 307/31
See application file for complete search history.

(56) References Cited

U.S. PATENT DOCUMENTS

| | | | |
|---|---|---|---|
| 5,355,854 A | 10/1994 | Aubee | |
| 6,300,689 B1 * | 10/2001 | Smalser | F03B 13/18 290/43 |
| 6,463,907 B1 | 10/2002 | Hiltner | |
| 6,748,932 B1 | 6/2004 | Sorter et al. | |
| 7,030,580 B2 * | 4/2006 | Hoff | B60L 11/123 180/65.285 |
| 9,088,180 B2 * | 7/2015 | Wedel | H02J 3/14 |
| 2006/0046107 A1 * | 3/2006 | Lindsey | H01M 8/04544 700/295 |
| 2008/0157443 A1 * | 7/2008 | Hock | B29C 47/0023 264/512 |
| 2014/0175887 A1 * | 6/2014 | Shao | H02J 3/16 307/72 |
| 2014/0244107 A1 * | 8/2014 | Delevski | B60R 16/03 701/36 |
| 2015/0054339 A1 * | 2/2015 | Zhao | H02J 3/16 307/24 |
| 2015/0222121 A1 * | 8/2015 | Kuttel | H02J 3/00 322/8 |

\* cited by examiner

*Primary Examiner* — Patrick C Chen
(74) *Attorney, Agent, or Firm* — Miller, Matthias & Hull

(57) ABSTRACT

A load management system is disclosed. The load management system may include a generator, a power source configured to drive the generator, a load bank configured to produce an electrical load on the generator, a chopper operatively connected to the generator and the load bank, and a chopper regulator in communication with the generator and the chopper. The chopper may be configured to modulate the electrical load of the load bank on the generator. The chopper regulator may be configured to monitor generator parameters and control the chopper based on the generator parameters.

17 Claims, 4 Drawing Sheets

SMART LOAD BANK AND EXCITATION CONTROL

FIELD OF THE DISCLOSURE

The present disclosure relates generally to generator sets and, more particularly, to load management systems and methods for generator sets.

BACKGROUND OF THE DISCLOSURE

Typically, a generator set, or genset, can be used as a primary, off-grid power source or as a backup power source to an existing electrical grid system. For example, gensets may be used to provide electrical power at construction sites where utility electricity may be unavailable. A genset is a combination of an electrical generator and an engine. The engine, or other prime mover, may combust fuel to provide mechanical power to the electrical generator. The electrical generator converts the mechanical power received from the engine into electrical power.

In practice, the power demand on the genset fluctuates as loads are activated and deactivated. During such transient states, gensets may generally be slow reacting in response to loading or unloading conditions. Accordingly, there exists a need for load management systems and methods that quickly respond to changes in power demand, while allowing the genset to stay within its nominal operating range.

A load management apparatus is disclosed in U.S. Pat. No. 9,088,180, entitled, "Load Shed Control Module for Use with Electrical Generator." The load management apparatus of the '180 patent selectively adds and sheds loads on the electrical generator to prevent overloading of the electrical generator. In particular, the '180 load management apparatus learns the load profile for each load during a learning mode and executes one or more load shed processes to control which electrical loads are loading the electrical generator.

While effective, there is still a need for systems and methods that can quickly respond to all loading and unloading power demands on the genset, while allowing the genset to stay within its nominal operating range.

SUMMARY OF THE DISCLOSURE

In accordance with one embodiment, a load management system is disclosed. The load management system may include a generator, a power source configured to drive the generator, a load bank configured to produce an electrical load on the generator, a chopper operatively connected to the generator and the load bank, and a chopper regulator in communication with the generator and the chopper. The chopper may be configured to modulate the electrical load of the load bank on the generator. The chopper regulator may be configured to monitor generator parameters and control the chopper based on the generator parameters.

In accordance with another embodiment, a method for managing power demands on a generator is disclosed. The method may include providing a load bank configured to produce an electrical load on the generator, a chopper operatively connected to the generator and the load bank and configured to modulate the electrical load of the load bank on the generator, and a chopper regulator in communication with the generator and the chopper. The method may further include receiving a signal indicative of an output voltage of the generator, comparing the output voltage of the generator and a target voltage preprogrammed into a memory associated with the chopper regulator, and sending a signal to the chopper to control the electrical load of the load bank on the generator based on the comparison of the output voltage of the generator and the target voltage. The receiving, comparing, and sending steps may be performed by the chopper regulator.

In accordance with another embodiment, a load management system for a generator driven by a power source is disclosed. The load management system may include a load bank configured to produce an electrical load on the generator, a chopper operatively connected between the generator and the load bank, and a chopper regulator in operative communication with the chopper and the generator. The chopper may be configured to modulate the electrical load of the load bank on the generator. The chopper regulator may be configured to monitor an output voltage of the generator, determine a voltage error between the output voltage and a target voltage preprogrammed into a memory associated with the chopper regulator, compare the voltage error to a predetermined deadband preprogrammed into the memory associated with the chopper regulator, and send a signal to the chopper to control the electrical load of the load bank on the generator if the voltage error is outside the predetermined deadband.

These and other aspects and features will become more readily apparent upon reading the following detailed description when taken in conjunction with the accompanying drawings. In addition, although various features are disclosed in relation to specific exemplary embodiments, it is understood that the various features may be combined with each other, or used alone, with any of the various exemplary embodiments without departing from the scope of the disclosure.

While the present disclosure is susceptible to various modifications and alternative constructions, certain illustrative embodiments thereof will be shown and described below in detail. The disclosure is not limited to the specific embodiments disclosed, but instead includes all modifications, alternative constructions, and equivalents thereof.

DETAILED DESCRIPTION

Figure 1:
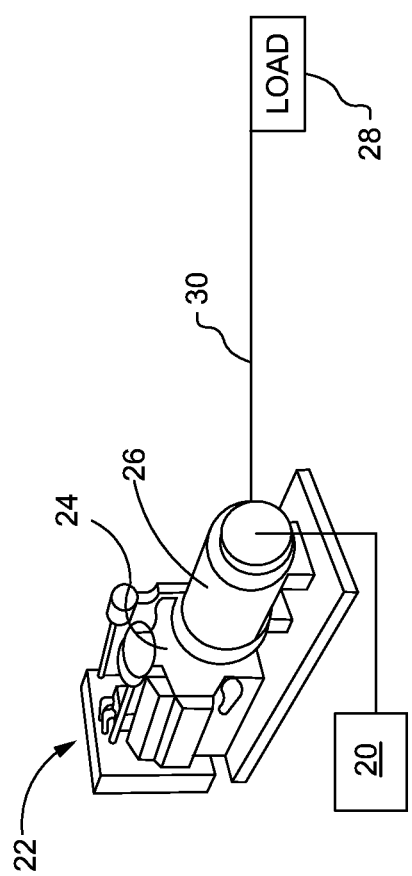
FIG. 1 is a schematic representation of a load management system, in accordance with one embodiment of the present disclosure.
Figure 2:
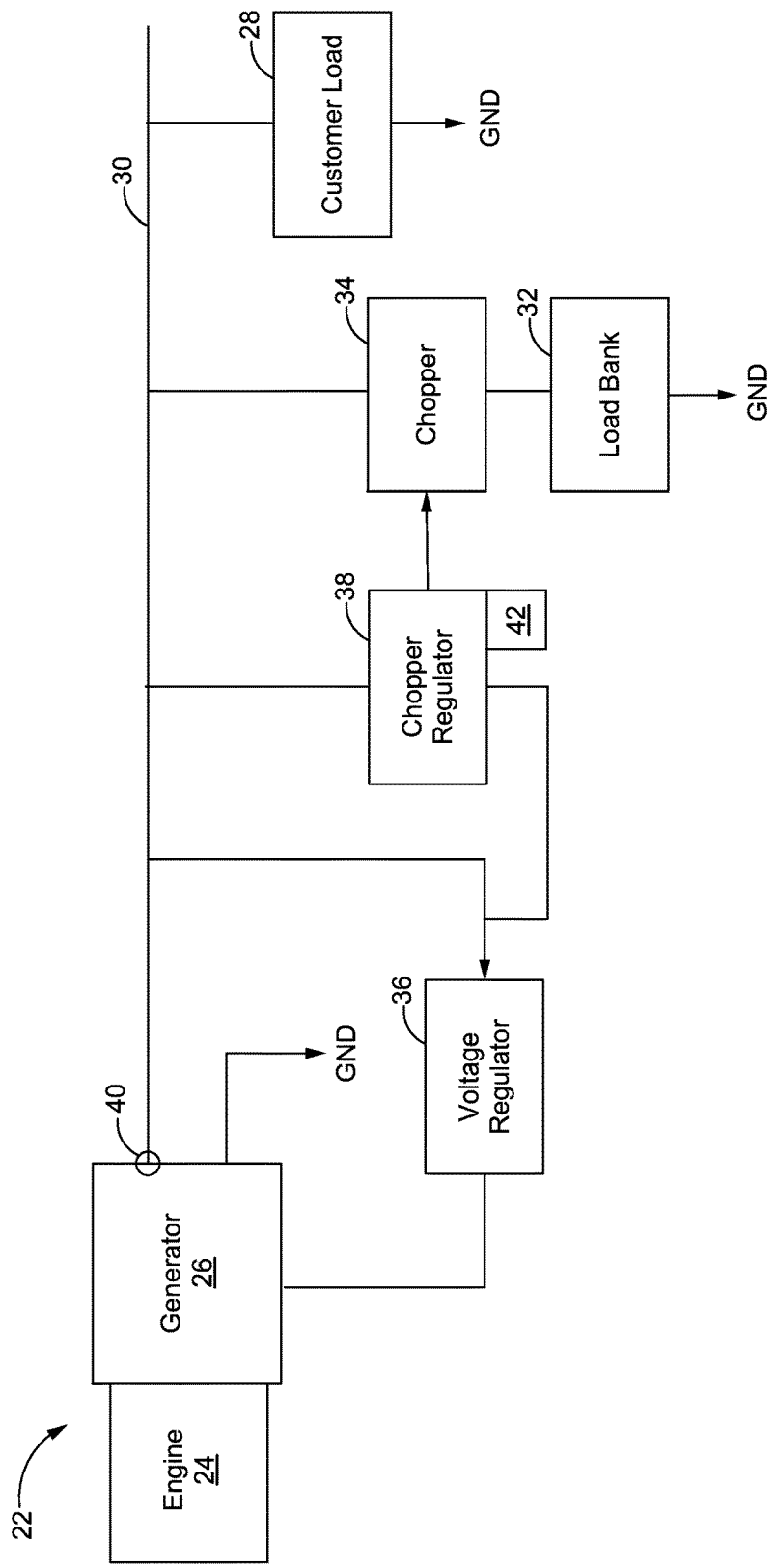
FIG. 2 is another schematic representation of the load management system of FIG. 1.

Referring now to the drawings, and with specific reference to FIGS. 1 and 2, a schematic representation of a load management system 20 for a generator set, or genset 22 is shown, in accordance with certain embodiments of the present disclosure. The genset 22 may comprise a power source 24 operatively coupled to a generator 26. The power source 24 or other prime mover may be configured to mechanically rotate and drive the generator 26. For example, the power source 24 may comprise an engine, such as a gasoline engine, a natural gas engine, a diesel engine, or any other source of mechanical power.

The generator 26 may convert mechanical power received from the power source 24 into electrical power. The electrical power produced by the generator 26 may be directed to a customer load 28 via one or more transmission lines 30. For example, the generator 26 may comprise a motor-generator, an alternating current (AC) induction generator, a permanent magnet generator, an AC synchronous generator, a switched reluctance generator, or any other type of generator. The load management system 20 may be used with the genset 22 to manage the customer load 28 on the generator 26. More specifically, the load management system 20 may be used to quickly respond to fluctuating power demands of the customer load 28 in transient states of loading and unloading.

As shown in FIG. 2, the load management system 20 may comprise a load bank 32, a chopper 34, a voltage regulator 36, and a chopper regulator 38. Operatively connected to the genset 22, the load bank 32 may be configured to produce a controllable electrical load on the generator 26. The load bank 32 may apply the electrical load on the generator 26 and dissipate the electrical power of the generator 26. For example, the load bank 32 may be resistive, inductive, capacitive, or any other type.

Furthermore, the load bank 32 may be used to compensate for rapid changes in power demand of the customer load 28 during transient states. For instance, the load bank 32 may be configured to consume a predetermined amount of electrical power from the generator 26, based on a percentage of the electrical load in the load bank 32 that is applied to the generator 26. When the power demand of the customer load 28 changes, the load management system 20 may adjust the predetermined amount of electrical power the load bank 32 is consuming by adjusting the percentage of the electrical load in the load bank 32 that is applied to the generator 26 in order to quickly meet the fluctuating power demand of the customer load 28.

Operatively connected between the generator 26 and the load bank 32, the chopper 34 may be configured to modulate the electrical load of the load bank 32 on the generator 26. The chopper 34 may be used to control and vary the percentage of the electrical load in the load bank 32 that is applied to the generator 26, thereby modulating the amount of power being consumed by the load bank 32. More specifically, the chopper 34 may comprise a switching device that connects and disconnects the electrical load in the load bank 32 at a high rate in order to provide variable power. For example, the chopper 34 may comprise one or more silicon controlled rectifier (SCR), insulated-gate bipolar transistor (IGBT), power metal oxide semiconductor field-effect transistor (MOSFET), power bipolar junction transistor (BJT), thyristor, gate turn off (GTO) thyristor, or combinations thereof. However, other devices may be used.

In operative communication with the generator 26, the voltage regulator 36 may be configured to maintain an output voltage of the generator 26 at a constant level, such as at a target voltage. For example, the target voltage may be a rated voltage of the generator 26. In one example, the rated voltage may be six hundred volts (600 V), although other target voltages may be used. The voltage regulator 36 may use a feed-forward control, a negative feedback control loop, or any other type of electronic regulation element to maintain the output voltage of the generator 26 at the target voltage.

The load management system 20 may also include a parameter unit 40 in operative communication with an output of the generator 26. The parameter unit 40 may be configured to determine the output voltage and other generator parameters, such as frequency, current, and speed, of the generator 26. For example, the parameter unit 40 may comprise a digital power meter configured to measure electrical power signals of the generator 26, such as output voltage, frequency, and current. In other examples, the parameter unit 40 may comprise sensors or be part of a generator controller associated with the generator 26. The voltage regulator 36 and/or the chopper regulator 38 may be operatively connected to the parameter unit 40 in order to receive signals indicative of the generator parameters associated with the generator 26.

In operative communication with the generator 26 and the chopper 34, the chopper regulator 38 may be configured to monitor the generator parameters associated with the generator 26 and control the chopper 34 based on the generator parameters. The chopper regulator 38 may be implemented using one or more of a processor, a microprocessor, a microcontroller, a digital signal processor (DSP), a field-programmable gate array (FPGA), and a processor-based device that may include or be associated with a non-transitory computer readable storage medium having stored thereon computer-executable instructions, or any other suitable means for electronically controlling functionality of the chopper 34. For instance, the chopper regulator 38 may include a proportional-integral-derivative (PID) controller with pulse width modulated (PWM) control, although other configurations may be used.

The chopper regulator 38 may be configured to operate according to predetermined algorithms or sets of instructions for operating the chopper 34 in order to control the electrical load of the load bank 32 on the generator 26. Such algorithms or sets of instructions may be programmed or incorporated into a memory 42 that is associated with or at least accessible to the chopper regulator 38. The memory 42 may be provided within and/or external to the chopper regulator 38, and may comprise a non-volatile memory. It is understood that the load management system 20 and the chopper regulator 38 may include other hardware, software, firmware, or combinations thereof.

In one example, the chopper regulator 38 may use chopper based voltage control. More specifically, the chopper regulator 38 may be configured to monitor the output voltage of the generator 26 and compare the output voltage to the target voltage preprogrammed into the memory 42 associated with the chopper regulator 38. If the output voltage is equal to the target voltage or within a predetermined range around the target voltage, this may indicate the power demand of the customer load 28 is steady or in a non-transient, stable loading condition.

During non-transient, stable loading conditions, the chopper regulator may be configured to apply, via the chopper 34, a predetermined percentage of the electrical load in the load bank 32 on the generator 26. The predetermined percentage may be preprogrammed into the memory 42 associated with the chopper regulator 38. For instance, the chopper regulator 38 may be configured to apply fifty percent (50%) of the electrical load in the load bank 32 on the generator 26 during non-transient, stable loading conditions. However, other percentages may be used.

In the example, if the output voltage is lower than the target voltage or the predetermined range around the target voltage, this may indicate an increase in power demand of the customer load 28. During transient loading conditions, the chopper regulator 38 may be configured to send a signal to the chopper 34 to decrease the electrical load of the load bank 32 applied on the generator 26. For instance, the chopper regulator 38 may be configured to send a signal indicative of a lower percentage of the electrical load in the load bank 32 to apply on the generator 26 during transient loading conditions. In so doing, the load bank 32 consumes less electrical power, thereby allowing increased electrical power to the customer load 28. Thus, the increased power demand of the customer load 28 may be quickly met without having to wait for the genset 22 to increase production of electrical power.

Continuing the example, if the output voltage is higher than the target voltage or the predetermined range around the target voltage, this may indicate a decrease in power demand of the customer load 28. During transient unloading conditions, the chopper regulator 38 may be configured to send a signal to the chopper 34 to increase the electrical load of the load bank 32 applied on the generator 26. For instance, the chopper regulator 38 may be configured to send a signal indicative of a higher percentage of the electrical load in the load bank 32 to apply on the generator 26 during transient unloading conditions. In so doing, the load bank 32 consumes more electrical power, thereby allowing decreased electrical power to the customer load 28. Thus, the decreased power demand of the customer load 28 may be quickly met without having to wait for the genset 22 to decrease production of electrical power.

Figure 3:
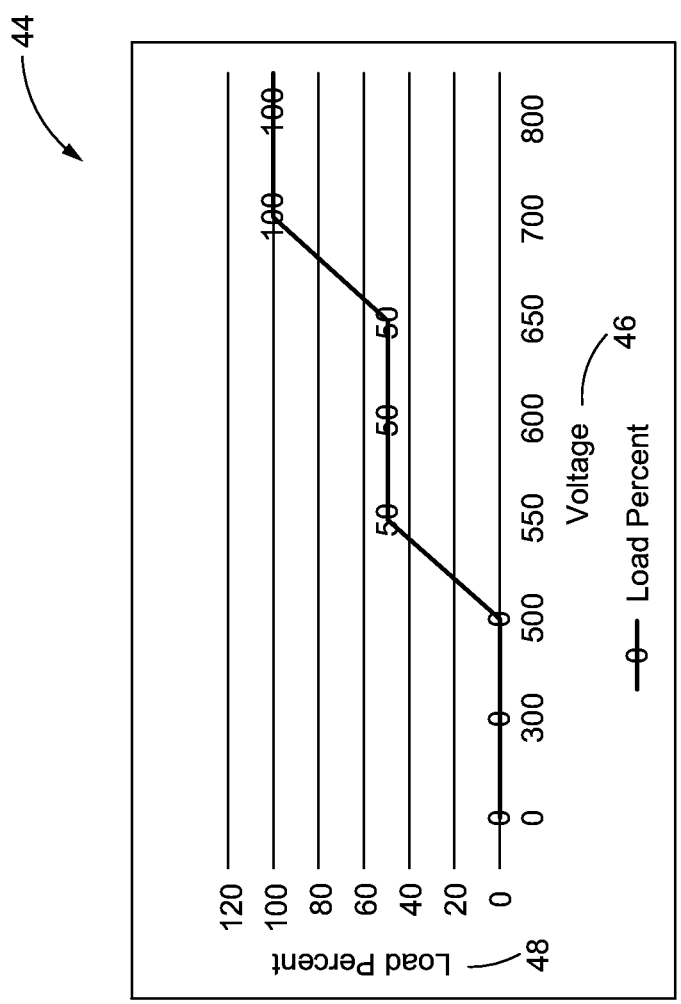
FIG. 3 is an example chopper voltage control curve, in accordance with another embodiment.

Furthermore, the chopper regulator 38 may be configured to control the chopper 34 according to a chopper voltage control curve 44, an example of which is shown in FIG. 3. The chopper voltage control curve 44 may be preprogrammed into the memory 42 associated with the chopper regulator 38. Based on the output voltage 46 of the generator 26, the chopper regulator 38 may be configured to retrieve a load value 48 from the chopper voltage control curve 44. The chopper regulator 38 may also be configured to send a signal to the chopper 34 to modulate the electrical load of the load bank 32 on the generator 26 according to the retrieved load value 48. For instance, the load value 48 may be a load percentage of the electrical load of the load bank 32 to apply on the generator 26, via the chopper 34, based on the output voltage 46.

By managing the load bank 32 via the chopper 34 and the chopper regulator 38, the load management system 20 may compensate for fluctuating power demands of the customer load 28. In so doing, the load management system 20 simultaneously limits excitation change of the generator 26 because the genset 22 may not have to increase or decrease production of electrical power. Thus, the genset 22 may maintain a constant speed, frequency, and voltage, staying within its nominal operating range while the customer load 28 still receives the electrical power demanded.

Furthermore, the chopper regulator 38 may be in operative communication with the voltage regulator 36. Based on the output voltage of the generator 26, the chopper regulator 38 may be configured to send a bias command to the voltage regulator 36 to adjust the target voltage of the generator 26. The bias command may increase or decrease the target voltage of the generator 26 by a predetermined amount. For example, the chopper regulator 38 may use a lookup table preprogrammed into the memory 42 associated with the chopper regulator 38 in order to retrieve the bias command using the output voltage of the generator 26. However, other configurations may be used to determine the bias command.

INDUSTRIAL APPLICABILITY

In general, the foregoing disclosure finds utility in various applications relating to the genset and/or generator industries. In particular, the disclosed load management system may be used to quickly respond to transient loading and unloading on the genset. More specifically, a dynamically managed perceived load is added to the generator via an external load bank. While managing the external load bank, the disclosed load management system also limits excitation change of the generator. Furthermore, the disclosed load management system manages the load of the external load bank perceived by the generator through chopper based voltage control. In so doing, the disclosed load management system may quickly respond to all loading and unloading power demands on the genset, while allowing the genset to stay within its nominal operating range.

Figure 4:
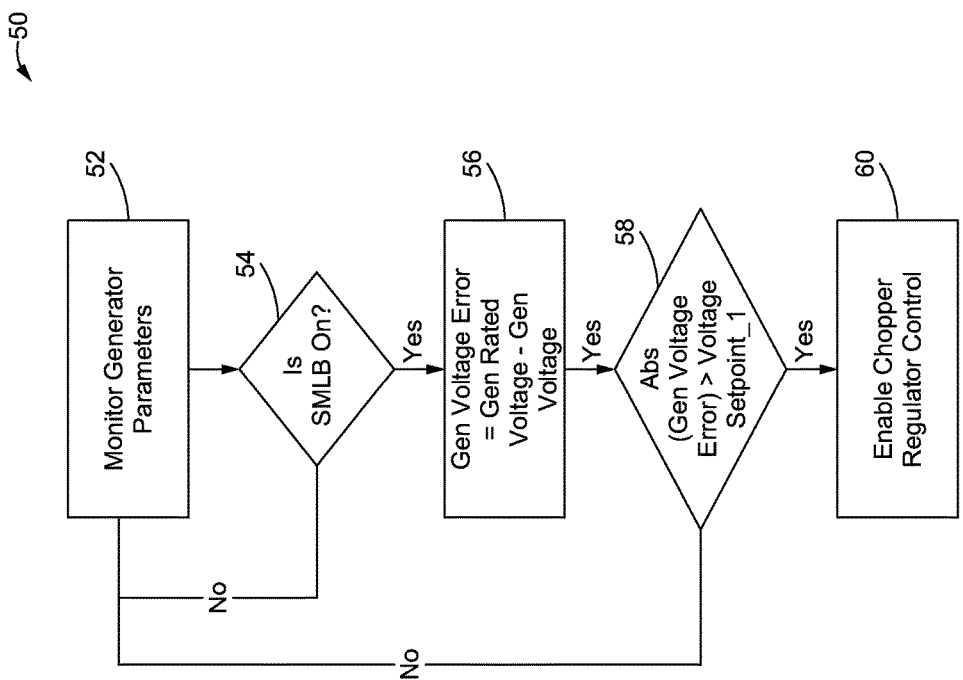
FIG. 4 is a flowchart illustrating an example process for managing power demands on a generator or a genset, in accordance with another embodiment.

Turning now to FIG. 4, with continued reference to FIGS. 1-3, a flowchart illustrating an example algorithm or process 50 for managing power demands on a generator or a genset is shown, in accordance with another embodiment. The algorithm or process 50 may be included in the chopper regulator of the load management system. For example, the algorithm or process 50 may be programmed into the memory associated with the chopper regulator. At block 52, the chopper regulator may be configured to monitor generator parameters. For example, the chopper regulator may receive signals indicative of an output voltage of the generator.

At block 54, the chopper regulator determines if the load bank is enabled. For instance, the chopper regulator may receive a signal from the chopper indicative of whether or not the load bank is enabled. If the load bank is disabled, then the process 50 proceeds back to block 52. If the load bank is enabled, then the process 50 proceeds to block 56. The chopper regulator determines a generator voltage error, at block 56. More specifically, the chopper regulator determines a difference between the output voltage of the generator and a target voltage in order to obtain the generator voltage error. The target voltage may be the rated voltage of the generator or any other reference voltage for the generator that is preprogrammed into the memory associated with the chopper regulator.

The generator voltage error is compared to a predetermined deadband preprogrammed into the memory associated with the chopper regulator, at block 58. More specifically, the absolute value of the generator voltage error may be compared to a voltage set point preprogrammed into the memory associated with the chopper regulator. For example, if the target voltage is 600 V, the predetermined deadband may be from 595 V to 605 V with the voltage set point being five volts (5 V). However, other numerical values for the target voltage, the predetermined deadband, and the voltage set point may be used.

If the output voltage is within the predetermined deadband, or the absolute value of the generator voltage error is less than or equal to the voltage set point, then the process 50 proceeds back to block 52. If the output voltage is outside the predetermined deadband, or the absolute value of the generator voltage error is greater than the voltage set point, then the process 50 proceeds to block 60. At block 60, chopper regulator control is enabled. More specifically, the chopper regulator may send signals to the chopper to adjust the electrical load of the load bank on the generator. For instance, the chopper regulator may send signals to the chopper according to a chopper voltage control curve, such as the example curve of FIG. 3, preprogrammed into the memory associated with the chopper regulator. Furthermore, the chopper regulator may also send signals indicative of bias commands to the voltage regulator to adjust the target voltage on the generator.

It is to be understood that the flowchart in FIG. 4 is shown and described as an example only to assist in disclosing the features of the disclosed system, and that more or less steps than that shown may be included in the processes corresponding to the various features described above for the disclosed system without departing from the scope of the disclosure.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A load management system, for managing transient loading and unloading of a fluctuating customer load, the load management system comprising:
    a generator;
    a power source configured to drive the generator;
    a load bank configured to produce an electrical load on the generator;
    a chopper operatively connected to the generator and the load bank, the chopper configured to modulate the electrical load of the load bank on the generator in response to the fluctuating customer load; and
    a chopper regulator in communication with the generator and the chopper, the chopper regulator configured to monitor generator parameters and control the chopper based on the generator parameters so as to maintain operation of the generator at a constant output, wherein the generator parameters include an output voltage of the generator, the chopper regulator is configured to retrieve a load value from a chopper voltage control curve preprogrammed into a memory associated with the chopper regulator based on the output voltage of the generator and to send a signal to the chopper to modulate the electrical load of the load bank on the generator according to the retrieved load value, and wherein the chopper regulator includes a proportional-integral-derivative controller.

2. The load management system of claim 1, wherein the chopper regulator is further configured to determine a voltage error between the output voltage and a target voltage.

3. The load management system of claim 2, wherein the chopper regulator is further configured to compare the voltage error to a predetermined deadband preprogrammed into the memory associated with the chopper regulator.

4. The load management system of claim 3, wherein if the voltage error is outside the predetermined deadband, the chopper regulator is further configured to control the chopper according to the chopper voltage control curve.

5. The load management system of claim 1, further comprising a voltage regulator in communication with the generator and the chopper regulator, the voltage regulator configured to maintain the output voltage of the generator at a target voltage.

6. The load management system of claim 5, wherein the chopper regulator is further configured to send a bias command to the voltage regulator to adjust the target voltage based on the output voltage of the generator.

7. The load management system of claim 1, including a voltage regulator operatively connected to the generator and the chopper regulator, wherein the voltage regulator is configured to adjust the output of the generator based in part on a bias command received from the chopper regulator.

8. A method for managing power demands of transient loading and unloading of a fluctuating customer load on a generator, comprising:
    providing a load bank configured to produce an electrical load on the generator separate from the customer load, a chopper operatively connected to the generator and the load bank and configured to modulate the electrical load of the load bank on the generator in response to the fluctuating customer load, and a chopper regulator in communication with the generator and the chopper;
    receiving a signal indicative of an output voltage of the generator;
    comparing the output voltage of the generator and a target voltage preprogrammed into a memory associated with the chopper regulator;
    sending a signal to the chopper to control the electrical load of the load bank on the generator based on the comparison of the output voltage of the generator and the target voltage, the receiving, comparing, and sending steps being performed by the chopper regulator so as to maintain operation of the generator at a constant output voltage; and
    storing a chopper voltage control curve into the memory associated with the chopper regulator, the signal sent to the chopper being based on the chopper voltage control curve.

9. The method of claim 8, further comprising controlling the chopper according to the chopper voltage control curve via the signal sent to the chopper.

10. The method of claim 9, further comprising providing the chopper regulator in communication with a voltage regulator associated with the generator, the voltage regulator configured to adjust the constant output voltage of the generator.

11. The method of claim 10, further comprising sending a signal from the chopper regulator to the voltage regulator based on the output voltage of the generator.

12. The method of claim 8,
    wherein the signal sent to the chopper causes the chopper to control the electrical load of the load bank on the generator according to a load value, the load value being retrieved based on the output voltage of the generator, and
    wherein the chopper regulator includes a proportional-integral-derivative controller.

13. A load management system for managing transient loading and unloading of a fluctuating customer load on a generator driven by a power source, the load management system comprising:
    a load bank configured to produce an electrical load on the generator, the electrical load on the generator being separate from the customer load;
    a chopper operatively connected between the generator and the load bank, the chopper configured to modulate the electrical load of the load bank on the generator in response to the fluctuating customer load; and
    a chopper regulator in operative communication with the chopper and the generator, the chopper regulator configured to monitor an output voltage of the generator, determine a voltage error between the output voltage and a target output voltage of the generator preprogrammed into a memory associated with the chopper regulator, compare the voltage error to a predetermined deadband preprogrammed into the memory associated with the chopper regulator, and send a signal to the chopper to control the electrical load of the load bank on the generator if the voltage error is outside the predetermined deadband so as to maintain operation of the generator at a constant output corresponding to the target output voltage by modulating the electric load of the load bank based on the monitored output voltage of the generator, wherein the chopper regulator is further configured to send the signal to the chopper according to a chopper voltage control curve preprogrammed into the memory associated with the chopper regulator.

14. The load management system of claim 13, wherein the chopper regulator is further configured to send a first control signal to the chopper to decrease the electrical load of the load bank on the generator if the output voltage is lower than the target output voltage.

15. The load management system of claim 14, wherein the chopper regulator is further configured to send a second control signal to the chopper to increase the electrical load of the load bank on the generator if the output voltage is greater than the target output voltage.

16. The load management system of claim 15, wherein the chopper regulator is further configured to send a third control signal to a voltage regulator associated with the generator to adjust the target output voltage on the generator based on the output voltage of the generator.

17. The load management system of claim 13,
wherein the chopper regulator is further configured to send the signal to the chopper to control the electrical load of the load bank on the generator according to a load value, the load value being retrieved based on the output voltage of the generator, and
wherein the chopper regulator includes a proportional-integral-derivative controller.

* * * * *